(12) United States Patent
Weber et al.

(10) Patent No.: US 9,141,835 B1
(45) Date of Patent: Sep. 22, 2015

(54) CARD READER FOR PROVIDING SWIPE FEEDBACK

(71) Applicant: Square, Inc., San Francisco, CA (US)

(72) Inventors: Trent Weber, San Francisco, CA (US); Thomas Templeton, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 147 days.

(21) Appl. No.: 13/791,551

(22) Filed: Mar. 8, 2013

(51) Int. Cl.
*G06K 7/08* (2006.01)
(52) U.S. Cl.
CPC ...................................... *G06K 7/082* (2013.01)
(58) Field of Classification Search
CPC ... G06Q 20/32; G06Q 20/322; G06Q 20/347; G06Q 20/02; G06Q 20/04; G06Q 20/20; G06Q 20/3278; G06Q 20/34; G06Q 20/3572; G06Q 20/363; G06Q 20/4037; G06Q 20/29; G06Q 20/325; G06Q 20/327; G06Q 20/388; G06Q 20/40; G06Q 20/4014
USPC .................. 235/449, 380, 379, 483, 482, 381
See application file for complete search history.

(56) References Cited

U.S. PATENT DOCUMENTS

| 4,084,214 | A | * | 4/1978 | Eppich | ...................... | 361/679.08 |
| 4,297,735 | A | * | 10/1981 | Eppich | .......................... | 360/240 |
| 4,609,957 | A | * | 9/1986 | Gentet et al. | .................. | 360/101 |
| 4,689,704 | A | * | 8/1987 | Holland-Letz | ................. | 360/240 |
| 5,444,616 | A | * | 8/1995 | Nair et al. | ....................... | 705/17 |
| 5,912,446 | A | * | 6/1999 | Wong et al. | .................... | 235/449 |
| 7,753,275 | B2 | * | 7/2010 | Schulz | ........................... | 235/449 |
| 2004/0094624 | A1 | * | 5/2004 | Fernandes et al. | ............. | 235/449 |
| 2009/0258692 | A1 | * | 10/2009 | Campos et al. | ................. | 463/19 |
| 2013/0299575 | A1 | * | 11/2013 | McKelvey et al. | ............ | 235/380 |

* cited by examiner

*Primary Examiner* — Thien M Le
(74) *Attorney, Agent, or Firm* — Novak Druce Connolly Bove + Quigg LLP (57) ABSTRACT

A card reader includes a body including a slot that is configured to receive a swipe of a card along a first axis with an edge of the card abutting a bottom surface of the slot, the slot including at least one region that is configured to increase frictional drag on the card in response to a longitudinal axis of the card varying from parallel to the bottom surface of the slot; and a reader interface positioned in the body and configured to read a magnetic stripe on the card as the card is swiped through the slot along the first axis.

17 Claims, 6 Drawing Sheets

CARD READER FOR PROVIDING SWIPE FEEDBACK

TECHNICAL FIELD

This disclosure relates to a card reader.

BACKGROUND

In conventional point of sale systems, electronic credit card transactions are processed using a card reader. Each transaction is typically authorized and captured. In the authorization stage, a physical credit card with a magnetic stripe is swiped through a merchant's magnetic card reader, e.g., as part of a point of sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. Debit card transactions can have a different routing, but also require swiping of the card.

SUMMARY

In one aspect, a card reader includes a body including a slot that is configured to receive a swipe of a card along a first axis with an edge of the card abutting a bottom surface of the slot, the slot including at least one region that is configured to increase frictional drag on the card in response to a longitudinal axis of the card varying from parallel to the bottom surface of the slot; and a reader interface positioned in the body and configured to read a magnetic stripe on the card as the card is swiped through the slot along the first axis.

Implementations can include one or more of the following. The at least one region is a surface recessed relative to a bottom surface of the slot. The recessed surface is a rounded corner located at an opening of the slot. The at least one region has a surface with a higher coefficient of friction when in contact with the card than the bottom surface of the slot when in contact with the card. The bottom surface of the slot is composed of plastic, and wherein the at least one region is composed of high friction material. The material comprises silicon. The material comprises thermoplastic elastomers (TPE). The bottom surface of the slot and the at least one region are composed of different materials. The bottom surface of the slot and the at least one region are composed of same materials, and wherein the at least one region is rougher. A length of the body and a length of the slot are less than 2 inches. A length of the body is a measure of an axis parallel to the slot. A width of the body is a measure of an axis perpendicular to the slot. The at least one region is a groove recessed relative to a bottom surface of the slot.

Advantages may include one or more of the following. An individual swiping a magnetic stripe card through a slot of a card reader will notice a frictional drag if the swipe was not performed in a linear motion along the bottom surface of the slot. The frictional drag can indicate to the individual that the swipe was not performed correctly and that the magnetic stripe card needs to be re-swiped. The kinesthetic feedback can also help individuals learn to swipe the magnetic stripe card in a linear motion. Error rates when swiping cards can be reduced, particularly for small card readers in which the slot is shorter than the card.

BRIEF DESCRIPTION OF THE DRAWINGS

Like reference numbers and designations in the various drawings indicate like elements.

DETAILED DESCRIPTION

When swiping a magnetic stripe card through a slot of a card reader, an individual performing the swipe typically needs to swipe the card through the slot in a linear motion that maintains vertical alignment of the tracks in the magnetic stripe on the card to the magnetic read head in the reader. If this is not done, the magnetic read head may not be able to accurately read the magnetic stripe. The general vertical position of the magnetic stripe can be set relative to the magnetic read head by having the individual insert the card so that an edge of the card rides on the bottom of the slot. However, if the individual moves the card at an angle relative to the bottom of the slot, or otherwise in a non-linear fashion, the tracks will not stay in alignment with the magnetic read head, which can result in an error. This can particularly be a problem for small card readers in which the slot is shorter than the card, although the problem can still occur in conventional card reader has a slot that is longer than the card.

The slot of the card reader can be configured so that individuals feel a difference in a frictional drag when their swipes are not performed in the proper motion, e.g., a linear motion parallel to the bottom surface of the slot. As a result of this kinesthetic feedback, individuals can, over time, learn to swipe their magnetic stripe cards with the proper motion, thereby reducing error rates.

Figure 1A:
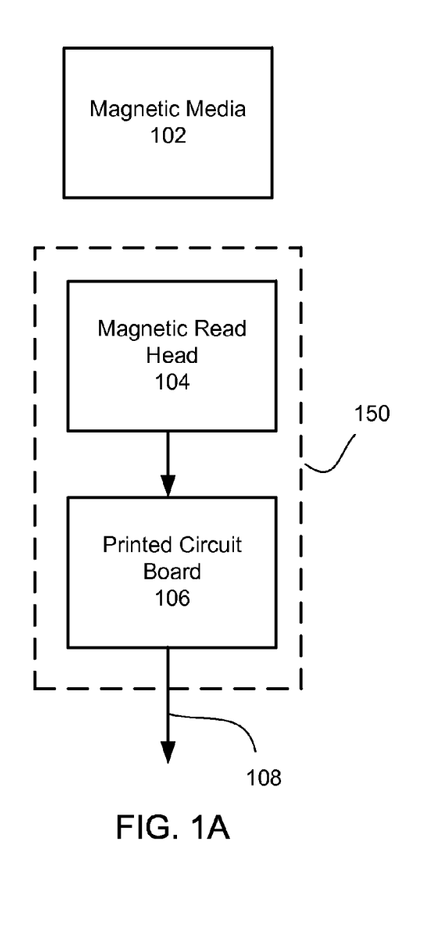
FIG. 1A is a block diagram of an example architecture for a system using a magnetic read head.

FIG. 1A is a block diagram of an example architecture for a system using a magnetic read head 104. The system can include magnetic media 102, the magnetic read head 104, and a printed circuit board 106. The magnetic read head 104 reads magnetic signals from the magnetic media 102, e.g., a magnetic stripe of a magnetic stripe card, and converts the magnetic signals to electrical signals. The magnetic read head 104 can send the electrical signals to the printed circuit board 106. Circuitry on the printed circuit board 106, e.g., an application specific integrated circuit (ASIC) or a programmed microprocessor, can process the electrical signals and perform operations based on the signals, and generate an output on an output terminal 108. For example, the circuitry on the printed circuit board 106 can determine a digital output, such as alphanumeric values stored on the magnetic stripe, e.g., a credit card number, from the electrical signals. The magnetic read head 104 and printed circuit board 106 are typically packaged together in a card reader 150.

Figure 1B:
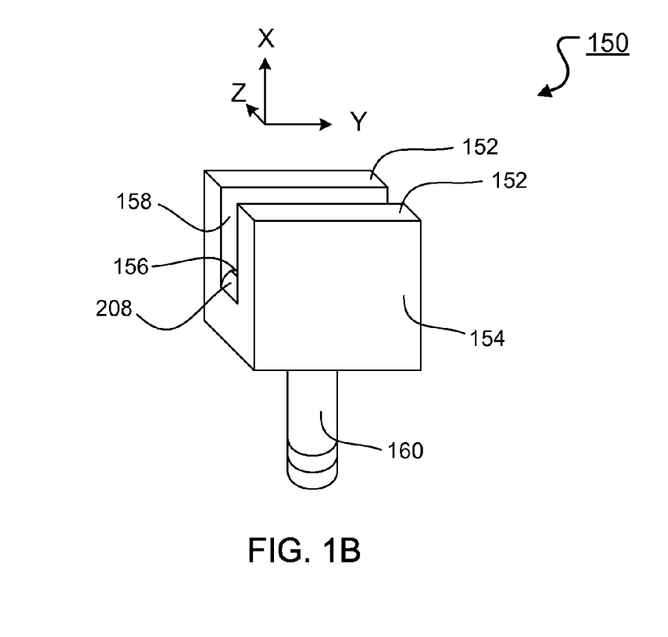
FIG. 1B is a schematic perspective view of a card reader.

FIG. 1B is a schematic perspective view of a card reader 150. The card reader 150 includes a body 154 that encapsulates a magnetic read head. The body 154 of the card reader 150 also includes a slot 156; the slot can be defined by a space between parallel first and second side wall 152 and closed off at the bottom by a bottom surface 156 extending between the side walls 152. The slot 156 can be open on near and far ends of the side walls 152. A magnetic stripe card can be swiped through the slot 156 in the body 154. The magnetic read head 104 can be positioned on the interior surface 158 of one of the side walls (see FIG. 2). The card reader 150 optionally includes an output connector 160 (e.g., an audio output jack, a Universal Serial Bus (USB) interface, a 30-pin connector interface, or a lightening interface) that provides the output terminal. Depending on the implementation, the output connector 160 can be replaced with a wireless interface, for example, Wi-Fi, Bluetooth, or Bluetooth LE. The card reader 150 is configured to transmit digital signals on the output jack 160 that represent a card number to a device that is configured to receive such digital signals.

Figure 2:
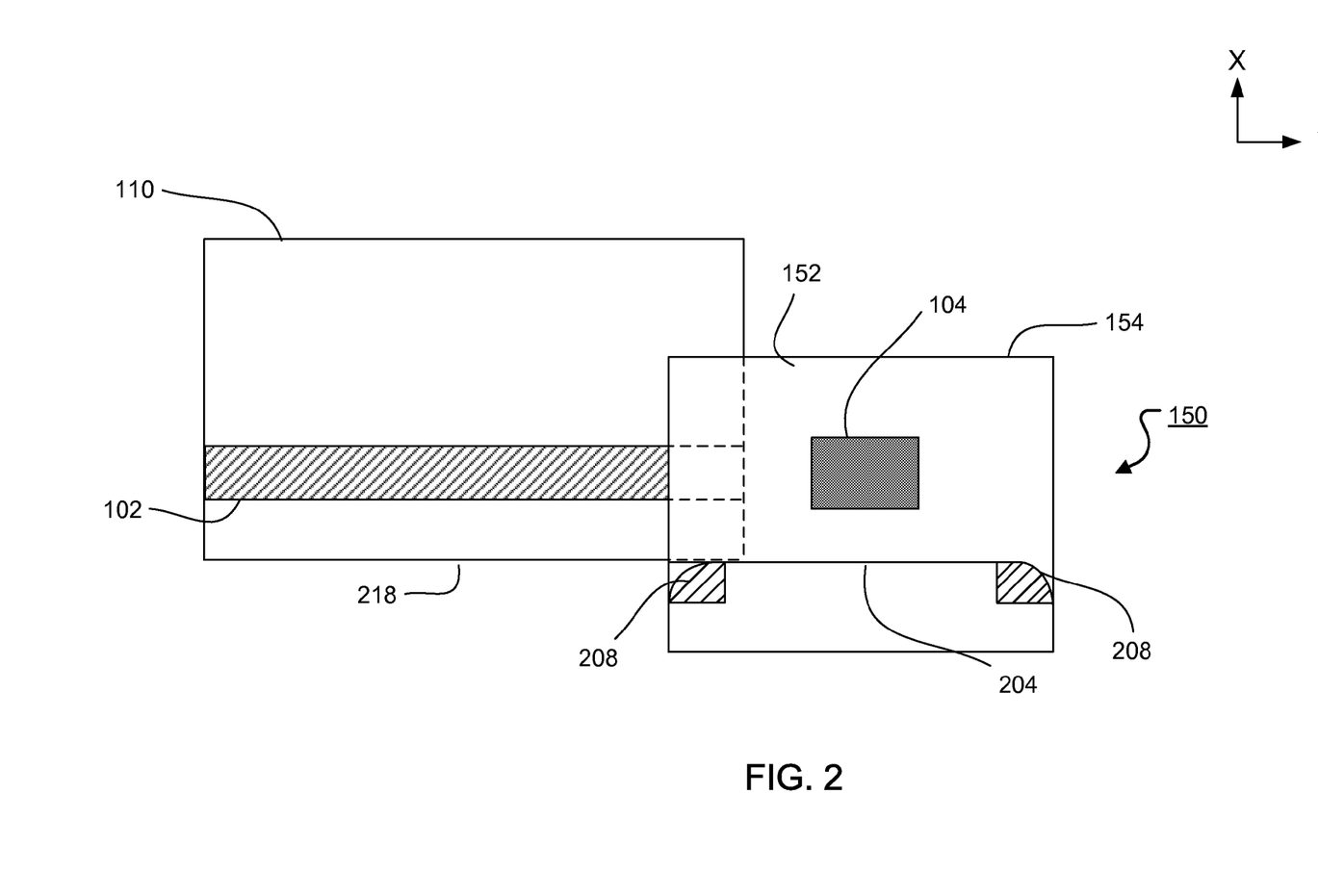
FIG. 2 is a side view of a magnetic read head in a card reader with a magnetic stripe card being swiped.

FIG. 2 is a side view of a magnetic read head 104 in the card reader 150 with a magnetic stripe card 110 being swiped. The card reader 150 can include a body 154 that encapsulates a magnetic read head 104. The magnetic stripe card 110 can be swiped through a slot of the body 154. The magnetic stripe 102 of the magnetic stripe card 110 can be scanned by the magnetic read head 104. The magnetic stripe 102 of the magnetic stripe card 110 is positioned in a XY plane adjacent to the magnetic read head 104. If the magnetic stripe card 110 is properly swiped, magnetic signals from the card 110, which can represent a card number, pass through the magnetic read head 104 and generate one or more currents. Changes in the currents can be digitized, e.g., by an analog to digital convertor on the printed circuit board, into digital signals for processing.

When swiping the magnetic stripe card 110 through the slot of the body 154, an individual performing the swipe typically needs to swipe the magnetic stripe card 110 in a direction parallel to the Y-axis through the slot and along the bottom surface 204 of the slot in a linear motion. That is, the individual typically needs to swipe in a motion that maintains vertical alignment of the tracks in the magnetic stripe on the card to the magnetic read head in the reader to ensure that the magnetic read head 104 is able to accurately read the magnetic stripe 102 of the magnetic stripe card 110. To this end, the bottom surface 204 of the slot can be configured to provide kinesthetic feedback to indicate that a swipe was not performed in a linear motion. This feedback, in effect, helps individuals learn to swipe the magnetic stripe card 110 in a linear motion that maintains vertical alignment of the tracks in the magnetic stripe on the card to the magnetic read head in the reader.

In some implementations, one or more interior surfaces of the slot in the body 154, e.g., the bottom surface 204, can include one or more regions 208 that are configured to increase frictional drag on the magnetic stripe card 110 in response to a longitudinal axis of the card varying from parallel to the bottom surface 204 of the slot. As a result, a person swiping the magnetic stripe card 110 through the slot will feel an increased frictional drag if, during the swipe, the longitudinal axis of magnetic stripe card 110 varies from parallel to the bottom surface 204 of the slot.

The one or more regions 208 can be a surface that is recessed relative to the bottom surface 204 of the slot. That is, the one or more regions 208 can be positioned within cavities in the bottom surface 204 of the slot. As shown in FIG. 2, the recessed surface can be a rounded corner that is located at an opening of the slot. For example, a first region 208 is shown as a rounded corner that is located at a first opening of the slot while a second region 208 is shown as a rounded corner that is located at a second opening of the slot. In some implementations, the bottom surface 204 of the slot in the body 154 includes one or more regions 208 that are composed of the same materials with at least one of the one or more regions 208 being rougher than the bottom surface 204.

Figure 5A:
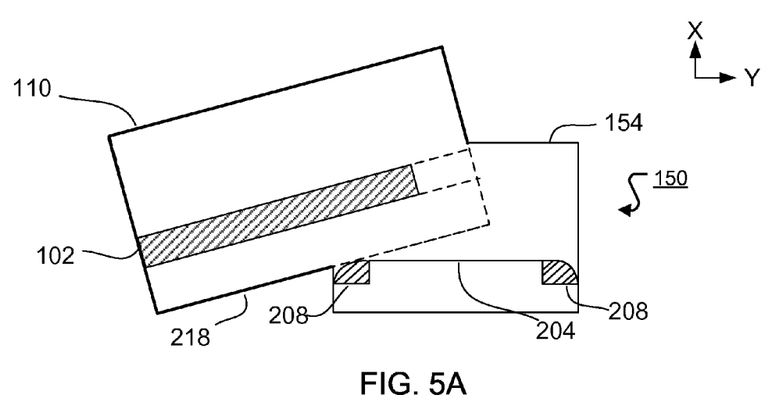
FIGS. 5A-5B are side views of a magnetic read head in a card reader with a magnetic stripe card being swiped at an angle relative to the bottom surface of the slot.
Figure 5B:
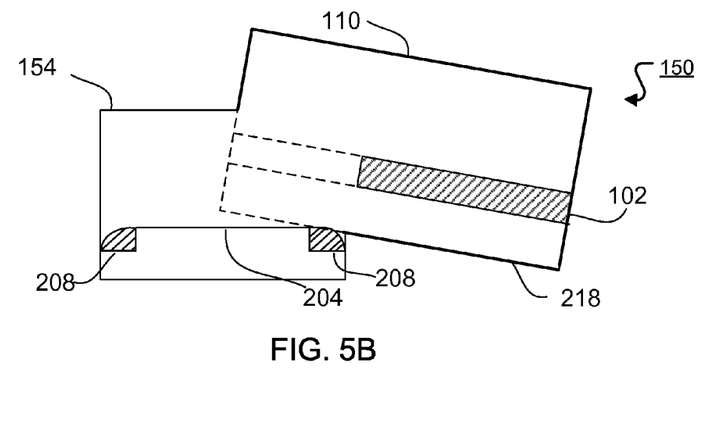

In situations where the individual swipes the magnetic swipe card in a linear motion that maintains vertical alignment of the tracks in the magnetic stripe on the card 110 to the magnetic read head 104 in the card reader 150, the card will not contact the regions 208 and the individual will not feel a difference in a frictional drag. However, in situations where the individual does not swipe the magnetic stripe card 110 in the proper motion, e.g., a linear motion parallel to the bottom surface of the slot, the bottom edge 218 of the magnetic stripe card 110 will come in contact with the one or more regions 208 and, as a result, the individual will feel a difference in a frictional drag. For example, as described in reference to FIGS. 6A and 6B, the individual will feel a frictional drag when the individual swipes the magnetic stripe card 110 at an angle relative to the bottom surface 204 of the slot.

The regions 208 can have a surface with a higher coefficient of friction when in contact with the magnetic stripe card 110 than the bottom surface 204 of the slot when in contact with the magnetic stripe card 110. In some implementations, the bottom surface 204 of the slot is composed of plastic. The one or more regions 208 are composed of a material with a higher coefficient of friction than the bottom surface 204. The difference in the coefficient of friction between the regions 208 and the bottom surface increases a likelihood that an individual swiping a card notices a difference in a frictional drag when the swipe is not performed in the proper motion, e.g., a linear motion parallel to the bottom surface of the slot can be used. Depending on the implementation, the higher friction material can be silicon, a thermoplastic elastomer (TPE), or some other high friction material.

Figure 3:
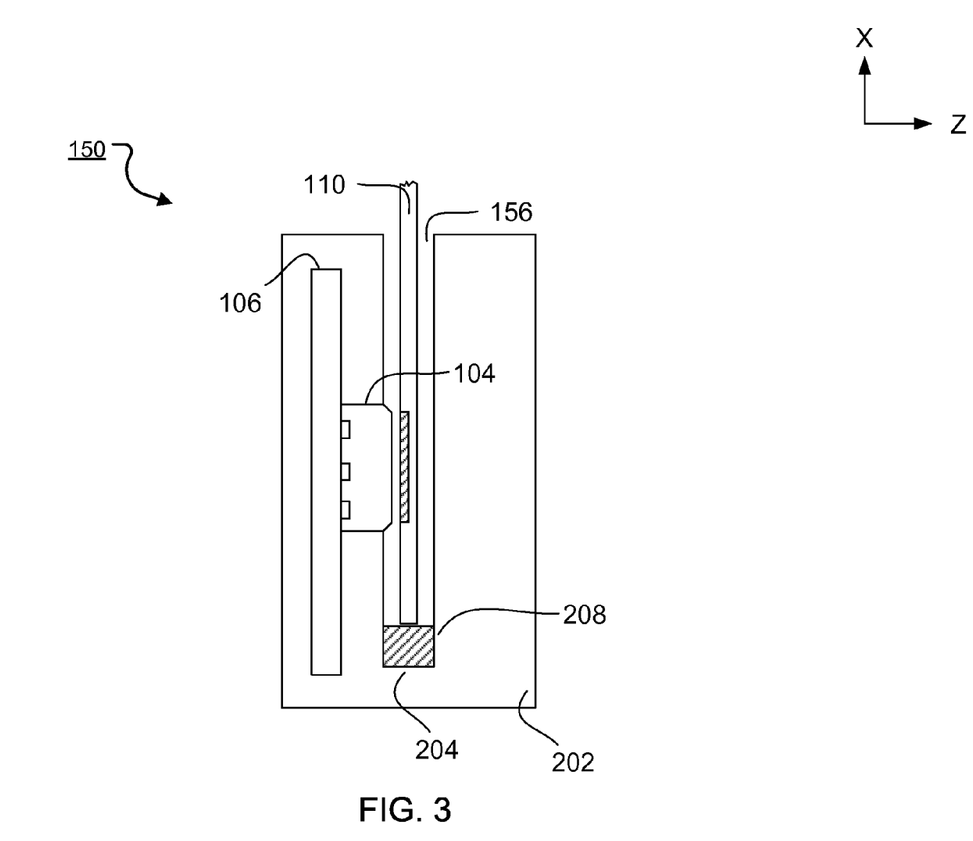
FIG. 3 is a side view of a magnetic read head in a card reader with a magnetic stripe card being swiped.

FIG. 3 is a side view of a magnetic read head 104 in a card reader 150 with a magnetic stripe card 110 being swiped. The card reader 150 can include a body 154 that encapsulates a magnetic read head 104 attached to a printed circuit board 106. Depending on the implementation, the body can be made of an engineering resin (e.g., polycarbonate or a polycarbonate-ABS blend) or stainless steel. The magnetic stripe card 110 can be swiped in a direction parallel to the Y-axis through a slot 156 of the body 154. The width of the body 154 can be a measure of an axis that is perpendicular to the slot 156. The bottom surface 204 of the slot 156 can include one or more regions 208 that are configured to increase frictional drag on the magnetic stripe card 110 in response to a longitudinal axis of the card varying from parallel to the bottom surface 204 of the slot, as described above.

Figure 4:
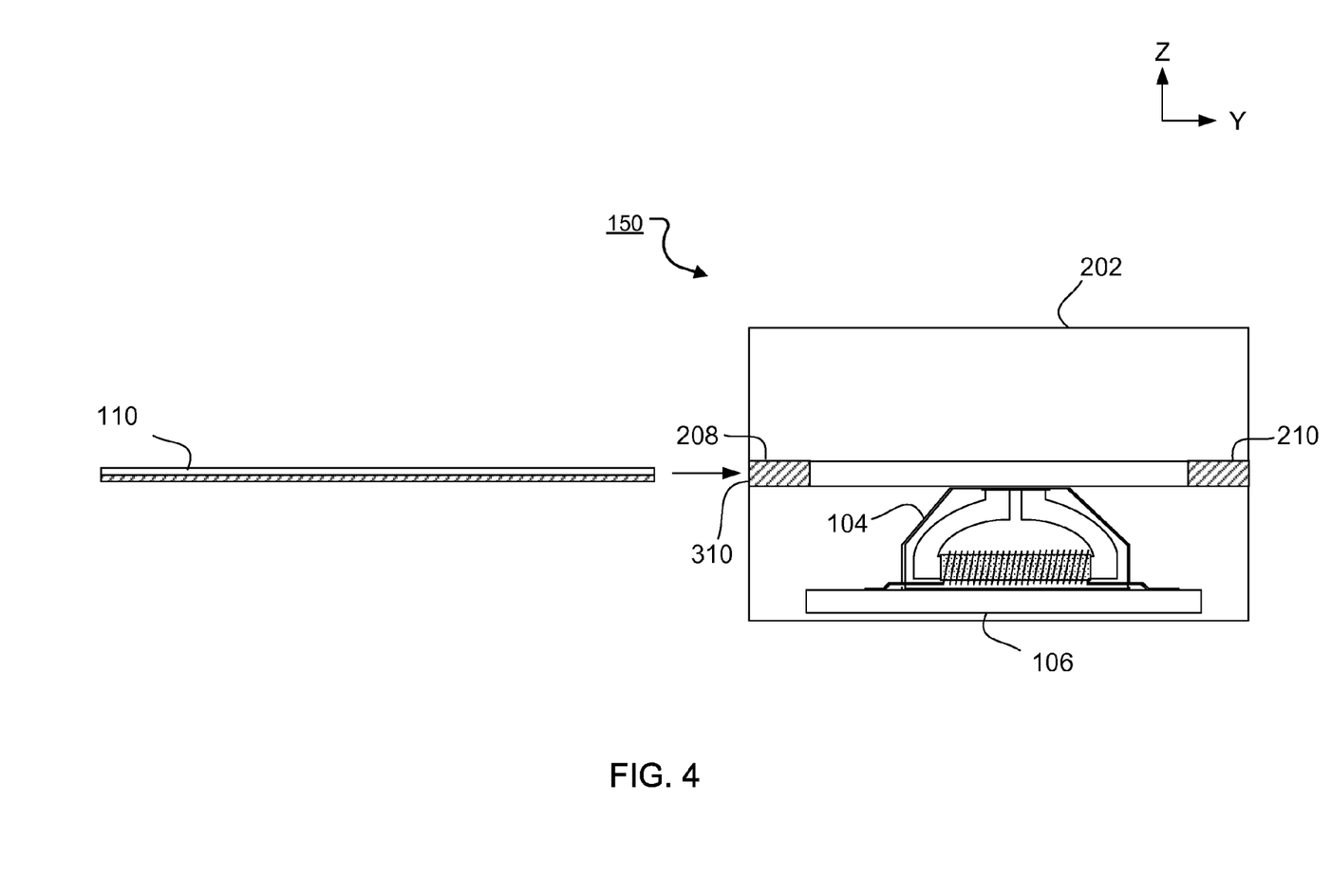
FIG. 4 is a top view of a magnetic read head in a card reader with a magnetic stripe card being swiped.

FIG. 4 is a top view of a magnetic read head 104 in a card reader 150 with a magnetic stripe card 110 being swiped. The card reader 150 can include a body 154 that encapsulates a magnetic read head 104 attached to a printed circuit board 106. The magnetic stripe card 110 can be swiped in a direction parallel to the Y-axis through a slot 156 of the body 154. The width of the body 154 can be a measure of an axis that is perpendicular to the slot 156. The length of the body 154 can be a measure of an axis that is parallel to the slot 156. In some implementations, the length of the body 154 and the slot 156 is less than two inches. The bottom surface of the slot 156 can include one or more regions 208 that are configured to increase frictional drag on the magnetic stripe card 110 in response to a longitudinal axis of the card varying from parallel to the bottom surface 204 of the slot, as described above.

FIG. 5A is a side view of a magnetic read head 104 in a card reader 150 with a magnetic stripe card 110 being swiped at an angle relative to the bottom surface 204 of the slot. FIG. 5A depicts swiping of the magnetic swipe card 110 at an angle relative to the bottom surface 204 of the slot. As a result, the magnetic stripe card 110 will come in contact with the first region 208 and the individual swiping the magnetic stripe card 110 will feel a difference in a frictional drag.

FIG. 5B is another side view of a magnetic read head 104 in a card reader 150 with a magnetic stripe card 110 being swiped at an angle relative to the bottom surface 204 of the slot. FIG. 5B depicts swiping of the magnetic swipe card 110 at an angle relative to the bottom surface 204 of the slot. As a result, the magnetic stripe card 110 will come in contact with the second region 208 and the individual swiping the magnetic stripe card 110 will feel a difference in a frictional drag.

Figure 6:
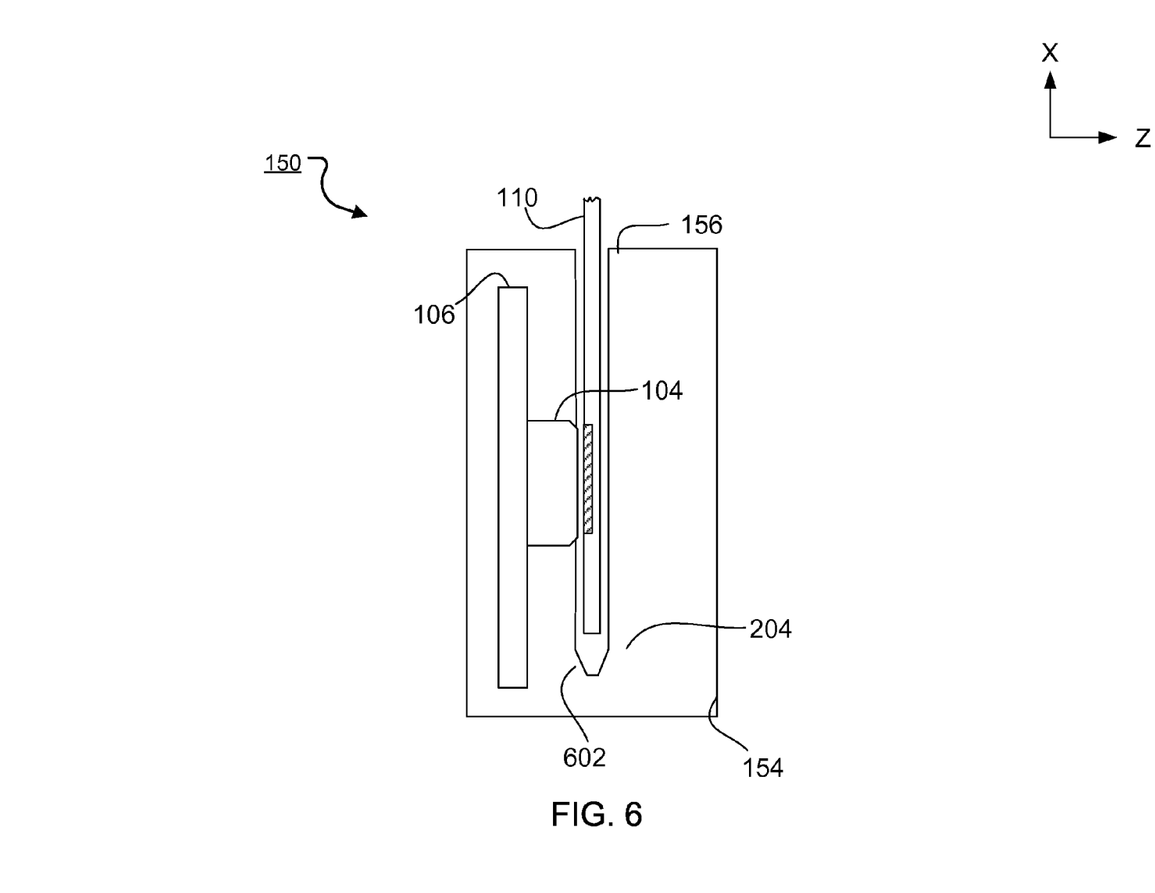
FIG. 6 is a side view of a magnetic read head in a card reader with a magnetic stripe card being swiped.

FIG. 6 is a side view of a magnetic read head 104 in a card reader 150 with a magnetic stripe card 110 being swiped. The card reader 150 can include a body 154 that encapsulates a magnetic read head 104 attached to a printed circuit board 106. The magnetic stripe card 110 can be swiped in a direction parallel to the Y-axis through a slot 156 of the body 154. The width of the body 154 can be a measure of an axis that is perpendicular to the slot 156. The slot 156 can include a pinching region 602 that is configured to pinch the magnetic swipe card 110 if it is swiped through the slot 156 at an angle to the Y-axis. The pinching region 602 can be formed by a region in which the side walls 152 of the body 154 are closer together so that the groove is narrower in the pinching region. The pinching region 602 can be groove that is recessed relative to the bottom surface 204 of the slot 156. The groove can be of a width that is slightly narrower than the width of the slot 156, e.g., about the same width as a credit card.

As a result pinching the card 110, the individual swiping the card will notice kinesthetic feedback (e.g., increased frictional drag on the card) indicating that the card 110 is being swiped in a proper motion, e.g., a linear motion parallel to the bottom surface 204 of the slot 156. As a result of this kinesthetic feedback, individuals can, over time, learn to swipe their magnetic stripe cards with the proper motion.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A card reader, comprising:
a body including a slot that is configured to receive a swipe of a card along a first axis with an edge of the card abutting a bottom surface of the slot, the slot including at least one region recessed relative to a bottom surface of the slot that is configured to increase frictional drag on the card in response to a longitudinal axis of the card varying from parallel to the bottom surface of the slot, wherein the recessed surface is a rounded corner located at an opening of the slot; and
a reader interface positioned in the body and configured to read a magnetic stripe on the card as the card is swiped through the slot along the first axis.

2. The reader of claim 1, wherein the at least one region has a surface with a higher coefficient of friction when in contact with the card than the bottom surface of the slot when in contact with the card.

3. The reader of claim 2, wherein the bottom surface of the slot is composed of plastic, and wherein the at least one region is composed of high friction material.

4. The reader of claim 3, wherein the material comprises silicon.

5. The reader of claim 3, wherein the material comprises thermoplastic elastomers (TPE).

6. The reader of claim 2, wherein the bottom surface of the slot and the at least one region are composed of different materials.

7. The reader of claim 2, wherein the bottom surface of the slot and the at least one region are composed of same materials, and wherein the at least one region is rougher.

8. The reader of claim 1, wherein a length of the body and a length of the slot are less than 2 inches.

9. The reader of claim 1, wherein a length of the body is a measure of an axis parallel to the slot.

10. The reader of claim 1, wherein a width of the body is a measure of an axis perpendicular to the slot.

11. The reader of claim 1, wherein the at least one region is a groove recessed relative to a bottom surface of the slot.

12. A carder reader comprising:
a body defining two side walls, and a bottom surface, the bottom surface including at least one region having a higher co-efficient of friction relative to the rest of the bottom surface; and
a magnetic stripe card reader interface positioned in one of the two side walls;
wherein the bottom surface is an angled corner located at an opening of the slot, whereby when a magnetic stripe card interfaces with the angled corner, a magnetic stripe of the magnetic stripe card does not interface with the magnetic stripe reader interface sufficiently to be read by the magnetic stripe card reader interface without error.

13. The reader of claim 12, wherein a length of the bottom surface is less than 2 inches.

14. The reader of claim 12, wherein the at least one region having a higher co-efficient of friction is recessed relative to the rest of the bottom surface.

15. A carder reader comprising:
a body defining two side walls, and a bottom surface, the bottom surface including at least one region having a higher co-efficient of friction relative to the rest of the bottom surface; and
a magnetic stripe card reader interface positioned in one of the two side walls;
wherein the at least one region having a higher co-efficient of friction is a rounded corner located at an opening of the slot.

16. The reader of claim 15, wherein the at least one region having a higher co-efficient of friction is a rougher surface than the rest of the bottom surface.

17. A carder reader comprising:
a body defining a slot having a bottom surface, the bottom surface of the slot including at least one region having a higher co-efficient of friction relative to the rest of the bottom surface; and a card reader interface positioned in the slot, whereby an ineffective card insertion is signaled to an operator of the card reader via at least tactile feedback originating from inserting a card into the slot against the region having the higher co-efficient of friction;

wherein the at least one region having a higher co-efficient of friction is a rounded corner located at an opening of the slot.

\* \* \* \* \*